US006234563B1

(12) United States Patent
Bascou

(10) Patent No.: US 6,234,563 B1
(45) Date of Patent: May 22, 2001

(54) ARTICULATION DEVICE FOR A HATCHBACK MOUNTED ON A MOTOR VEHICLE BODY

(75) Inventor: Jacques Bascou, Bazemont (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/424,853

(22) PCT Filed: Jun. 5, 1998

(86) PCT No.: PCT/FR98/01145

§ 371 Date: Apr. 6, 2000

§ 102(e) Date: Apr. 6, 2000

(87) PCT Pub. No.: WO98/55721

PCT Pub. Date: Dec. 10, 1998

(30) Foreign Application Priority Data

Jun. 6, 1997 (FR) .................................................. 97 07056

(51) Int. Cl.[7] ........................................................ B60J 5/10

(52) U.S. Cl. ......................... 296/146.8; 296/56; 296/106; 296/146.11; 296/146.12

(58) Field of Search .......................... 296/56, 106, 146.8, 296/146.11, 146.12; 49/208, 246, 253, 250

(56) References Cited

U.S. PATENT DOCUMENTS

| | | | | |
|---|---|---|---|---|
| 4,679,841 | * | 7/1987 | Taunay | 296/106 X |
| 4,688,844 | * | 8/1987 | Hirose et al. | 296/106 X |
| 6,018,912 | * | 2/2000 | Baughman et al. | 296/56 X |
| 6,068,327 | * | 5/2000 | Taunay | 296/106 X |

FOREIGN PATENT DOCUMENTS

| | | | |
|---|---|---|---|
| 2703005 | * | 9/1994 | (FR) . |
| 2739349 | * | 4/1997 | (FR) . |

* cited by examiner

*Primary Examiner*—D. Glenn Dayoan
*Assistant Examiner*—Lori L. Coletta
(74) *Attorney, Agent, or Firm*—Oblon, Spivak, McClelland, Maier & Neustadt, P.C.

(57) ABSTRACT

An articulation device for a hatchback mounted pivoting on a motor vehicle via a swivel rod. A structure is provided for automatically controlling the hatchback pivoting movement by a pivoting movement of a first end of a rod relative to the vehicle body structure. The hatchback pivoting direction, relative to the second end of the rod, is reversed during the first end of the rod pivoting movement between two extreme angular positions associated with extreme closed and opened positions of the hatchback.

16 Claims, 7 Drawing Sheets

ARTICULATION DEVICE FOR A HATCHBACK MOUNTED ON A MOTOR VEHICLE BODY

BACKGROUND OF THE INVENTION

1. Field of the Invention

The present invention relates to an articulation device for a motor vehicle hatchback closure, especially a rear door, which is mounted pivotally on the vehicle body structure.

The invention relates more particularly to an articulation device in which the hatchback closure is mounted pivotally, especially between a first closed extreme position and a second open extreme position, by means of a mechanism with two parallel articulation axes linked by at least one connecting rod.

2. Discussion of the Background

Such a device is described and illustrated in, for example, French Patent Application FR A 2717213.

In that document, use is made of a pair of parallel rods, a first front end of which is pivoted on the vehicle body structure around a first articulation axis, the second rear end of which is pivoted on the hatchback closure around a second articulation axis, parallel to the first articulation axis, and means are provided for automatically controlling the pivoting movement of the hatchback closure relative to the second end of the rod by the pivoting movement of the first end of the rod relative to the vehicle body structure.

Such a design makes it possible in particular to ensure articulation of a vehicle rear door, manipulation of which then requires only slight effort to move from closed position to an open position, and which can be manipulated without much effort from the closed position to the fully open position.

In French Patent Application FR A 2739349 there was proposed a use of such an articulation device more particularly to ensure the mounting pivotally of a door which, in closed position, extends in a substantially vertical plane and which, in open position, extends in a substantially horizontal plane above the vehicle.

When the rear portion of a vehicle is equipped with such a door, as is the case, for example, in vehicles of the "monospace" type, the rear door has large dimensions and mass.

This second document therefore proposes, to facilitate manipulation of the door, incorporating in the articulation device means for balancing the hatchback closure by applying thereto a balancing couple which compensates for the resisting couple due to the mass of the hatchback closure.

SUMMARY OF THE INVENTION

It is found, however, that in order for the user to be able easily to open or close the rear door, a relatively large minimum space must be available at the rear of the vehicle, in order to permit at least deflection of the rear door between its closed extreme position and its open extreme position, during which deflection the panel comprising the door is displaced substantially parallel to itself with substantially vertical orientation over the course of the first portion of the path away from closed position.

Thus it is evident that the panel passes through an intermediate position which is substantially midway between its two extreme positions, in which it extends at a distance from the rear vertical plane of the vehicle that is substantially equal to the length of the rods, this distance determining, for the lower rim of the panel, a path resembling the arc of a circle whose radius progressively increases because of the nature of the design of the articulation and automatic movement control device, which relies on a rack whose front and rear toothed longitudinal ends cooperate with pinions fixed respectively on the hatchback-closure body structure and on the panel structure.

The object of the invention is to remedy this disadvantage by proposing an improved articulation device which makes it possible to open the rear door even if the space available at the rear of the vehicle is extremely restricted, especially when another vehicle is parked close to the rear bumper.

For this purpose, the invention proposes an articulation device of the type cited in the foregoing, characterized in that the direction of pivoting of the hatchback closure relative to the second end of the rod is reversed during the pivoting movement of the first end of the rod relative to the vehicle body structure, between two extreme angular positions associated with the closed and open extreme positions of the hatchback closure.

According to other characteristics of the invention:

- the automatic control means contain a servo-control mechanism provided in particular with a rack which is mounted to slide longitudinally relative to the shank of the rod, a first toothed end of which cooperates continuously with a first pinion linked in rotation to the vehicle body structure, and the second end of which is formed as a fork, the two substantially parallel toothed branches of which extend toward the rear and are respectively capable of cooperating alternately with one or the other of two diametrically opposite toothed sectors of a second pinion linked in rotation to the hatchback closure;
- each of the two branches of the fork is mounted such that it can turn relative to the shank of the rack, around a front axis of rotation parallel to the articulation axes of the rod, and each is urged elastically to rotate around its axis in the direction corresponding to the engagement of the branch with the corresponding toothed sector of the second pinion, and each branch is provided with means for control of its angular position to bring about its engagement with or disengagement from the teeth of the second pinion as a function of the longitudinal position of the second end of the rack relative to the shank of the rod;
- the control means are provided with a control finger supported by the branch and extending laterally to cooperate with a control ramp of substantially longitudinal orientation, formed in facing relationship on the shank of the rod, close to the second rear end of the said rod;
- each ramp is provided with two consecutive segments, one being external for disengagement and the other internal for engagement, separated by a reversing recess which permits passage of the control finger from one to the other of the two segments, which are offset transversely relative to one another and relative to the longitudinal axis of sliding of the rack;
- the hatchback closure is a door which, in closed position, extends in a substantially vertical plane and which, in open position, extends in a substantially horizontal plane above the vehicle;
- the door is formed by a panel which covers an opening in a structural frame defined by one upper crossbeam, two lateral posts and one lower crossbeam, among which each lateral post supports an articulation axis of the said end of a connecting rod of the door, the other end of which is pivoted on an articulation axis supported by the door;

the device is provided with means for balancing the hatchback closure by applying thereto a balancing couple which compensates for the resisting couple due to the mass of the hatchback closure.

BRIEF DESCRIPTION OF THE DRAWINGS

Other characteristics and advantages of the invention will become apparent upon reading the detailed description hereinafter, which can be understood by referring to the attached drawings, wherein.

DESCRIPTION OF THE PREFERRED EMBODIMENTS

Figure 1:
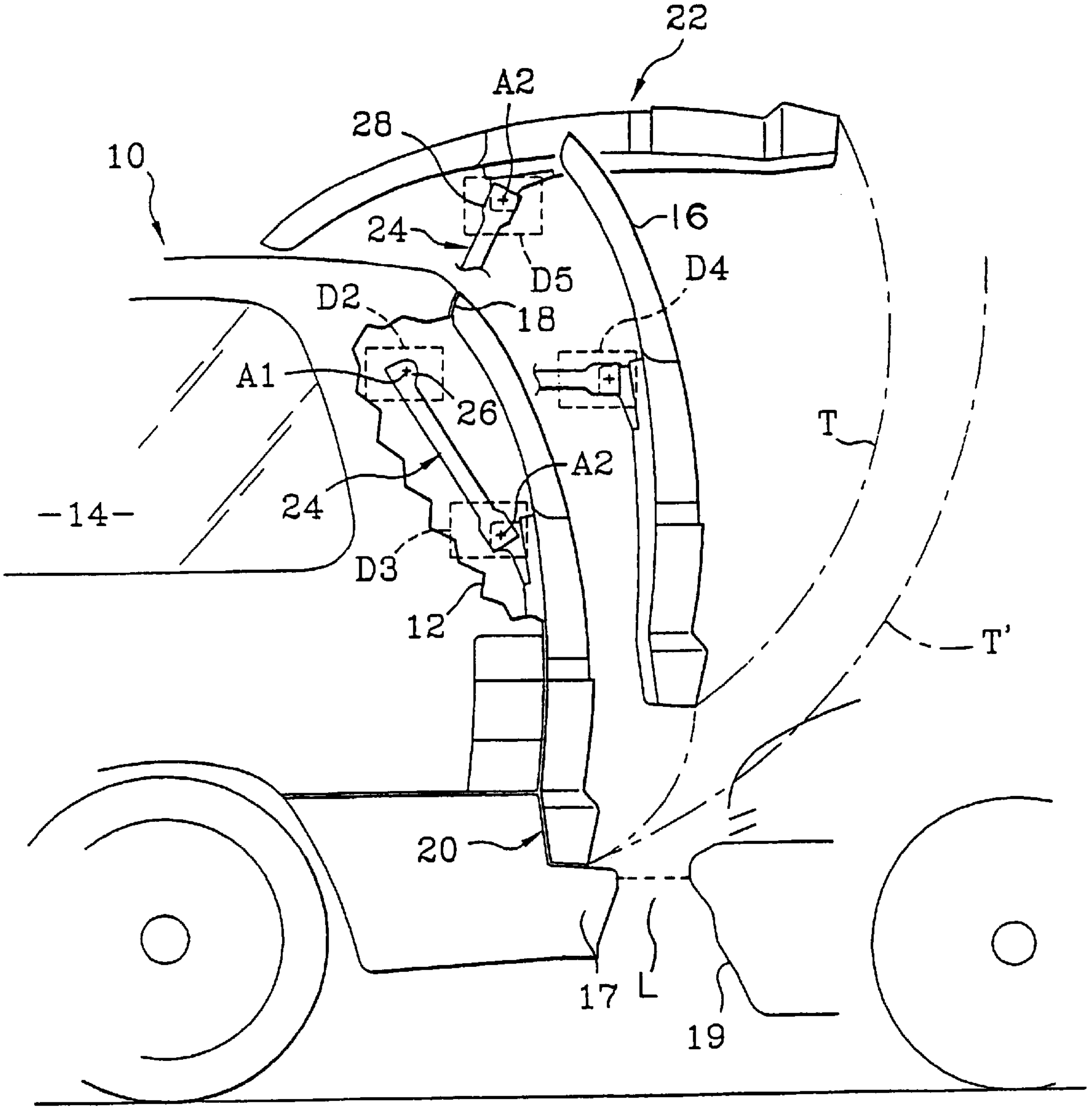
FIG. 1 is a partly cutaway side view of the rear portion of a motor vehicle, the rear door of which is equipped with an articulation device according to the teachings of the invention and which is illustrated, by means of solid lines, in open extreme position and, by means of outlines, in closed extreme position as well as in a substantially midway intermediate position, in which reversal of the direction of pivoting of the hatchback closure takes place.

In FIG. 1 there is shown a side view of the rear portion of a motor vehicle 10, whose body 12 is open at the rear to permit access to passenger compartment 14 of the vehicle and, for example, loading thereof.

For this purpose, the opening is defined by a frame which extends in a substantially vertical plane and which is comprised substantially by two vertical side posts, one of which is shown in FIG. 1, the opposite side post being installed symmetrically relative to the central longitudinal plane of general symmetry of the vehicle, and by an upper crossbeam 18 and lower crossbeam 20, which define an opening to be closed by a hatchback closure 22, also known as the rear door, which as a whole is mounted pivotally relative to the structure of body 12 of the vehicle, around horizontal axes.

In FIG. 1, door 22 is illustrated in maximum open extreme position.

According to one known design, hatchback closure 22 is mounted pivotally on body 12 by a system of two horizontal geometric articulation axes A1 and A2 by virtue of an articulation mechanism containing two parallel rods, which extend substantially parallel to the longitudinal axis of the vehicle, and one 24 of which is illustrated in the figures.

Figure 2:
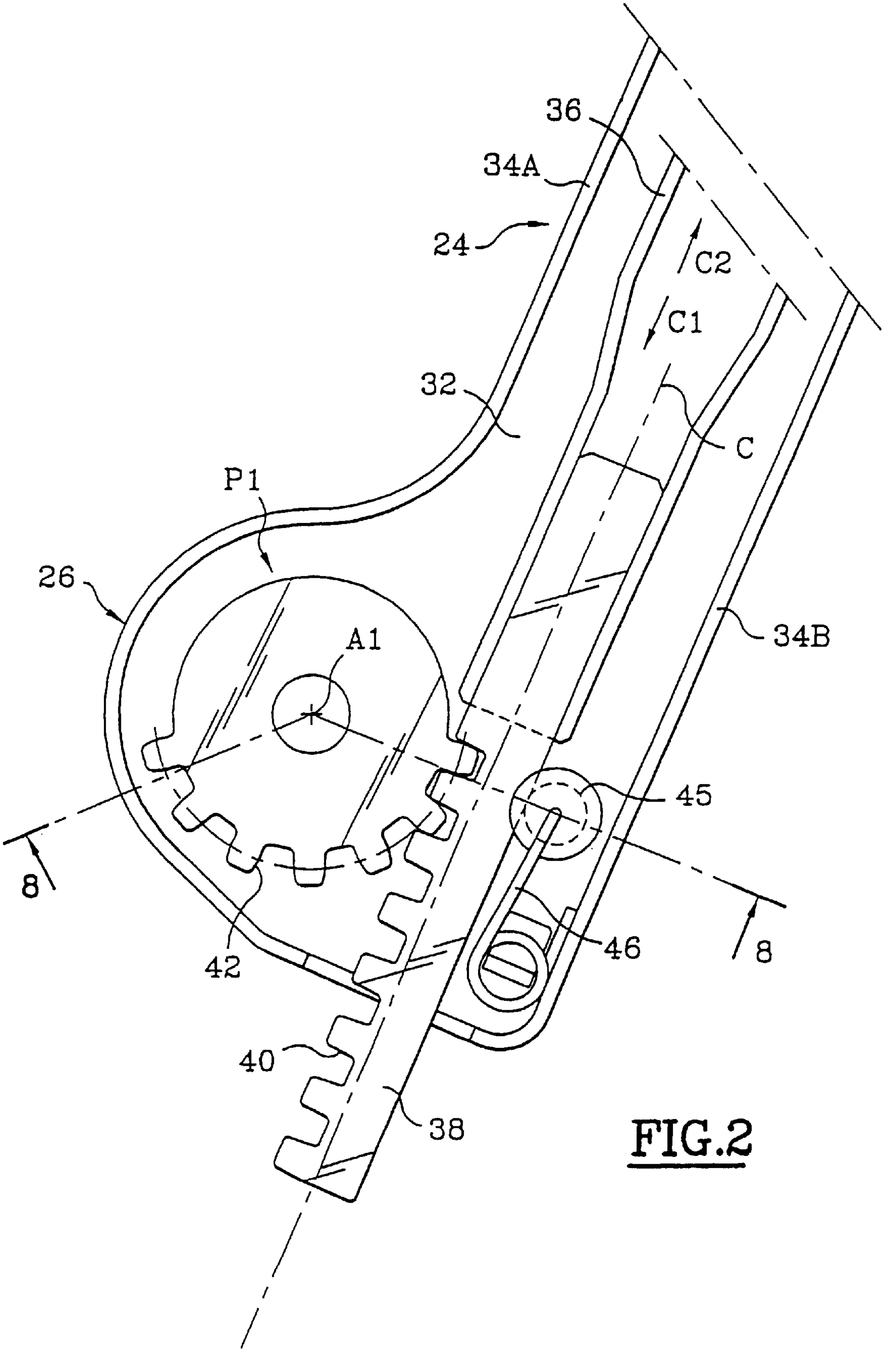
FIG. 2 is an elevation on larger scale of detail D2 of FIG. 1, in which there are illustrated the main elements of the front end of a connecting rod according to the teachings of the invention.
Figure 8:
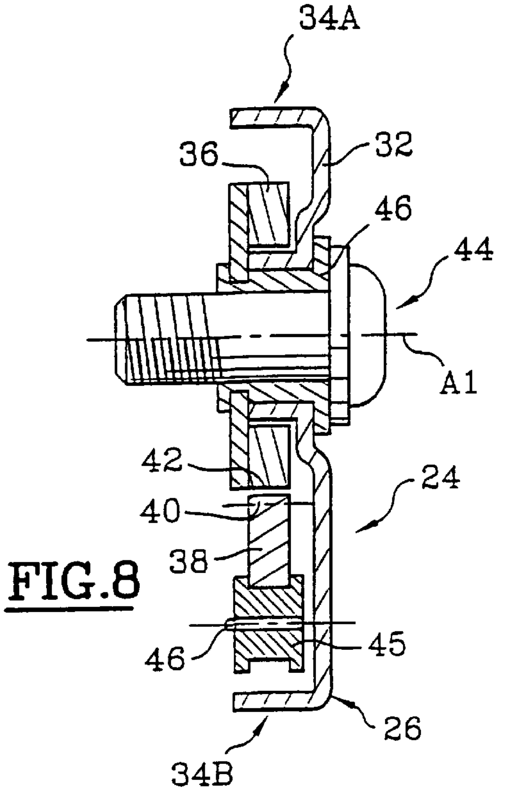
FIG. 8 is a sectional view along line 8—8 of FIG. 2.
Figure 6:
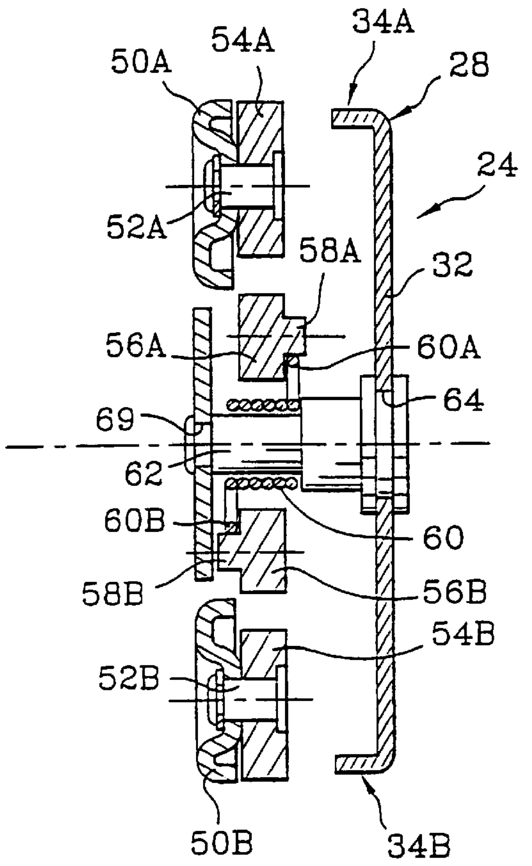
FIGS. 6 and 7 are sectional views along lines 6—6 and 7—7 of FIG. 4.

Referring to FIGS. 1, 2 and 8, it is apparent that first front end 26 is mounted pivotally on the vehicle body structure around first front articulation axis A1, while opposite second end 28 is pivoted on hatchback closure 22 around second rear articulation axis A2, parallel to first articulation axis A1, these two axes extending in the general transverse direction of the vehicle.

First articulation axis A1 is situated vertically close to crossbeam 18 and, in extreme open position, door 22 extends in a substantially horizontal plane above vehicle 10 and in particular, partially above the vehicle roof.

According to a known technique, which is described and illustrated, for example, in French Patent Applications FR A 2703005 or FR A 2717213, the contents of which may be consulted for further details, the pivoting movement of hatchback closure 22 around axis A2, relative to second end 28 of rod 24, is as a whole automatically controlled by the pivoting movement of first end 26 of rod 24 relative to vehicle body structure 12, 16 by a servo-control mechanism.

As can be seen in the figures, the shank of rod 24 is substantially comprised by a cut and stamped sheet-metal part having the general form of a plate 32, longitudinal and parallel rims 34A and 34B of which are folded over at right angles.

Rod 24 therefore has the form of a hollow member, in which there are provided different components belonging to the servo-control mechanism.

Servo-control mechanism 30 is provided with a rack 36, whose tubular shank is mounted to slide longitudinally inside rod 24 along a general sliding line C, in a first sliding direction C1 toward the front and in a second direction C2 toward the rear.

The front free end 38 of rack 36 is a toothed sector, whose teeth 40 cooperate with facing teeth 42 of a first toothed pinion P1 of axis A1 fixed on a vehicle body structural element by means of a screw 44 which supports a bush 46 to assure that rear end 26 of rod 24 is mounted to rotate around axis A1.

Toothed end 38 is maintained in cooperation with the teeth of pinion P1 by the intermediary of a roller 45, which urges it elastically under the action of a spring 46 fixed to rod 24.

From the position illustrated in FIG. 2, it is evident that simultaneous rotation of rod 24 and rack 36 around axis A1 causes rack 36 to slide along line C in direction C2 relative to the shank of rod 24, the rack being displaced in opposite direction C1 when the direction of rotation of the rod is reversed relative to fixed pinion P1.

Figure 3:
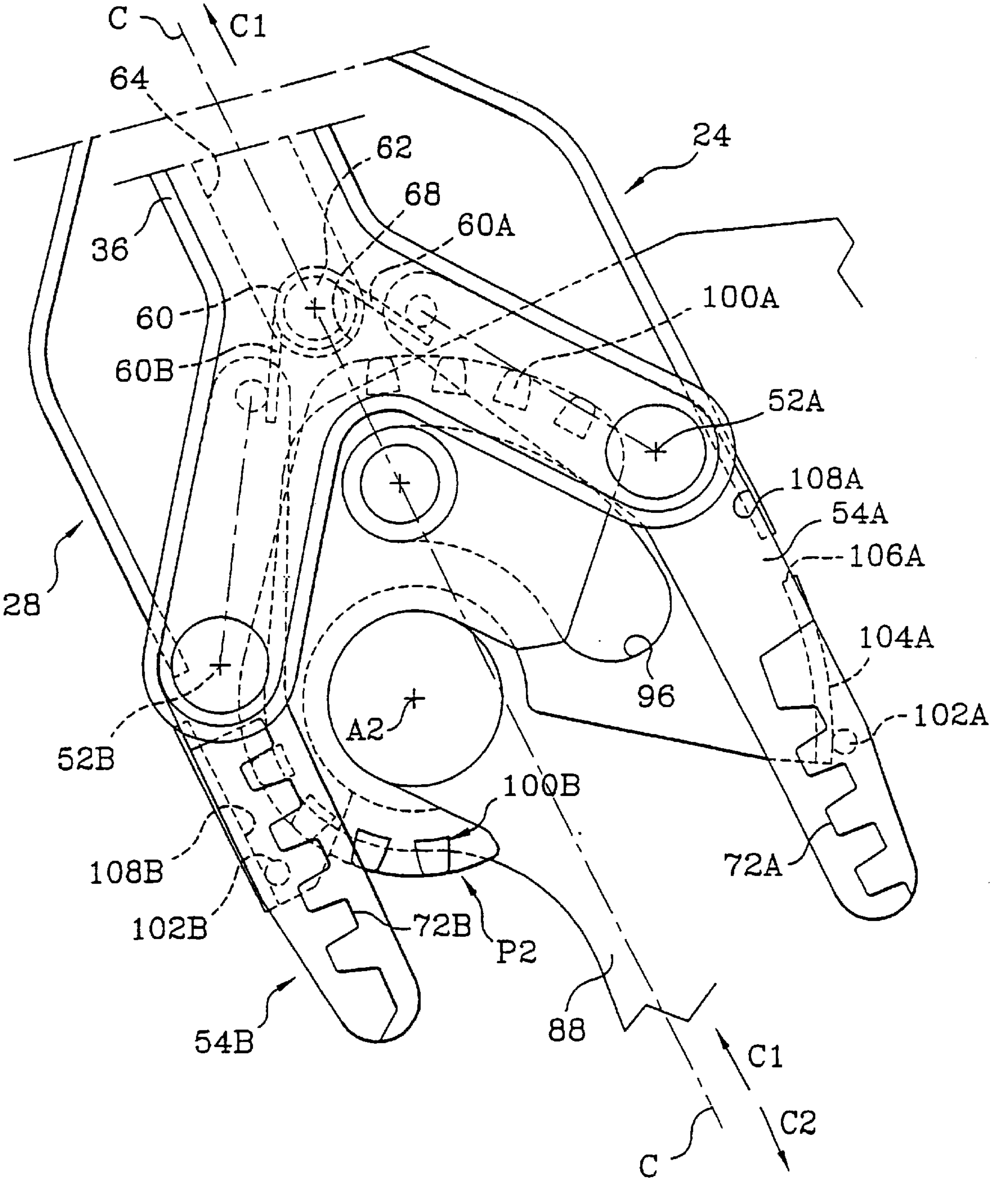
FIG. 3 is an elevation on larger scale corresponding to detail D3 of FIG. 1, which illustrates the rear end of the connecting rod linked to the door.
Figure 4:
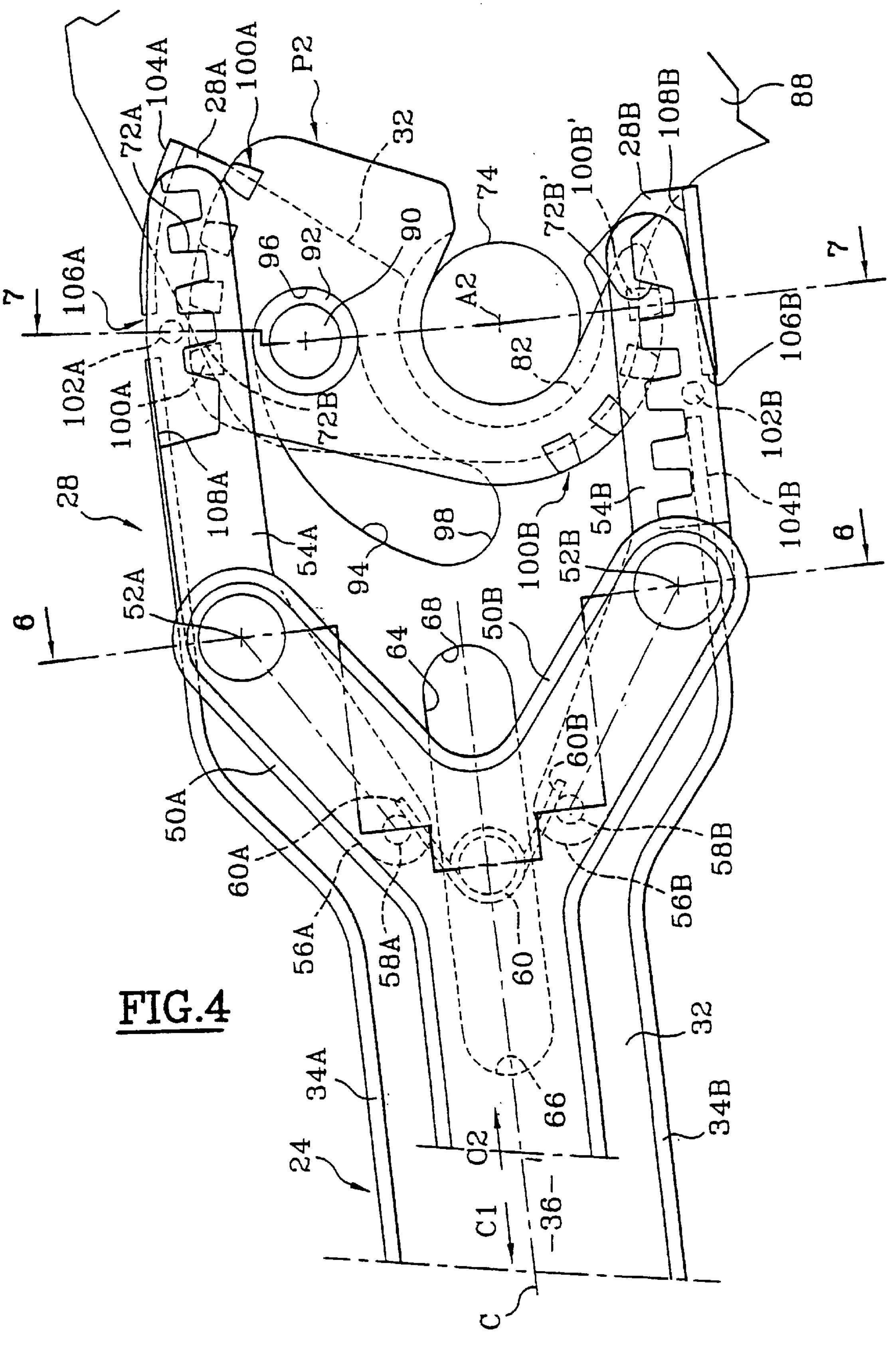
FIGS. 4 and 5 are views similar to that of FIG. 3 corresponding to details D4 and D5 of FIG. 1.
Figure 5:
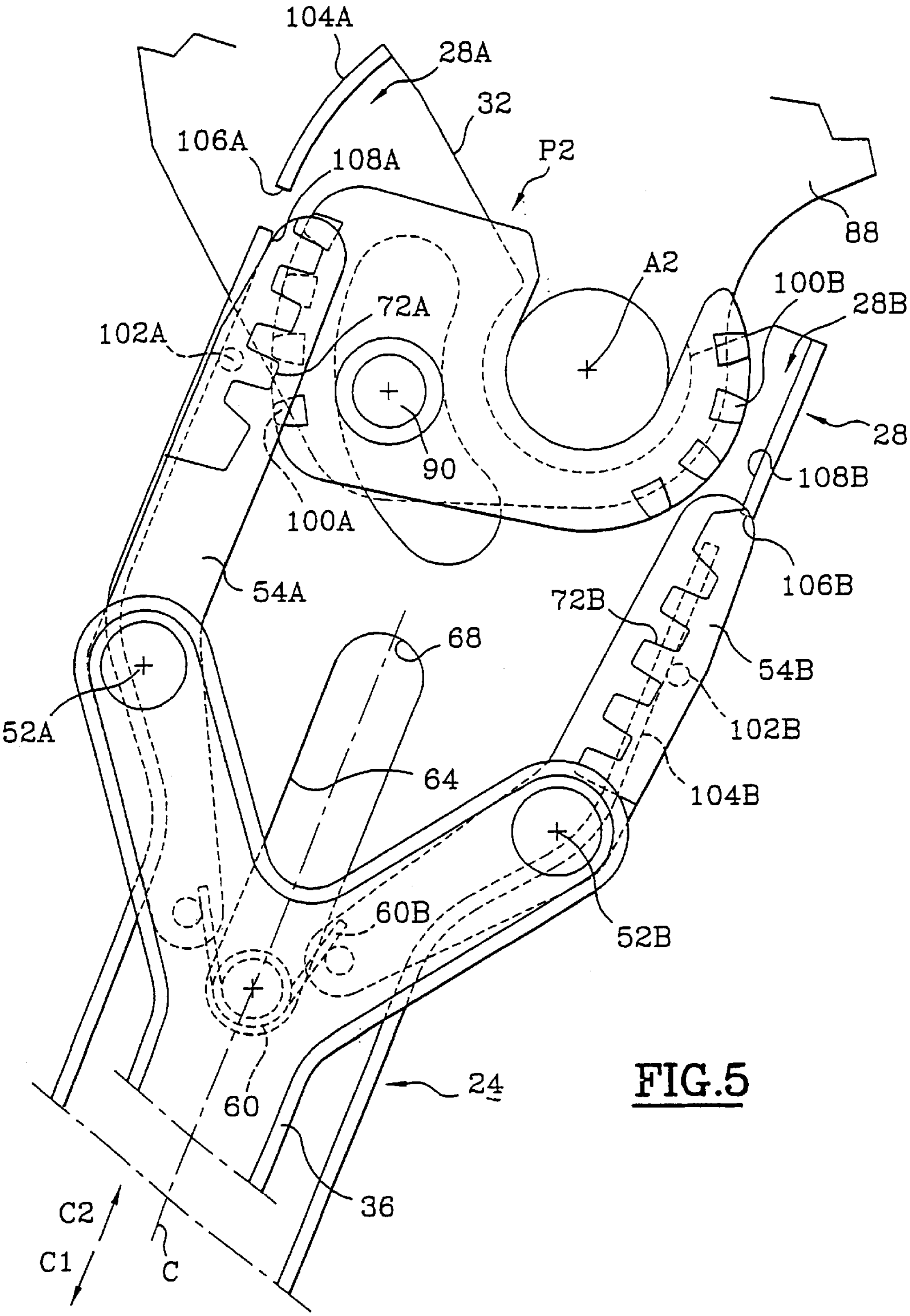

As can be seen in particular in FIGS. 3 to 5, rear free end 28 of the shank of rod 24 is fashioned into the shape of a fork with two parallel branches 28A and 28B, which are interconnected by plate-shaped member 32.

In the same manner, the rear second end of rack 36 is fashioned as a fork with two articulated branches.

For this purpose, its tubular shank is divided into a Y by two rear end branches 50A and 50B, each of which supports at its free end, around a pivot 52A, 52B, a toothed rack segment 54A, 54B.

The two toothed segments 54A, 54B thus extend longitudinally toward the rear, substantially parallel to sliding line C, from their rear longitudinal portions which are mounted pivotally on branches 50A and 50B around axes parallel to axes A1 and A2.

Each toothed branch or segment 54A, 54B is prolonged toward the front, beyond pivot 52A, 52B, by a tail 56A, 56B, each of which supports a finger 58A, 58B which extends laterally and which cooperates with one of the prongs 60A, 60B of a wire spring 60, the core of which is coiled helically around a finger 62 which is mounted slidingly in an oblong slot 64, which is formed in plate 32 of the shank of rod 24 and extends longitudinally along line C while being bounded by its front end rim 66 and rear end rim 68. To cause finger 62 to move slidingly together with rack 36, its other end is clamped in a hole 69 of the shank of the rack.

Thus, referring to FIGS. 3 to 5, toothed segment 54A is continuously urged elastically to rotate around the axis of pivot 52A in clockwise direction, while opposite toothed segment 54B is urged to rotate in counterclockwise direction; that is, spring 60 tends continuously to urge teeth 72A, 72B of the two segments toward one another and toward second rear articulation axis A2 situated inside the fork.

Figure 7:
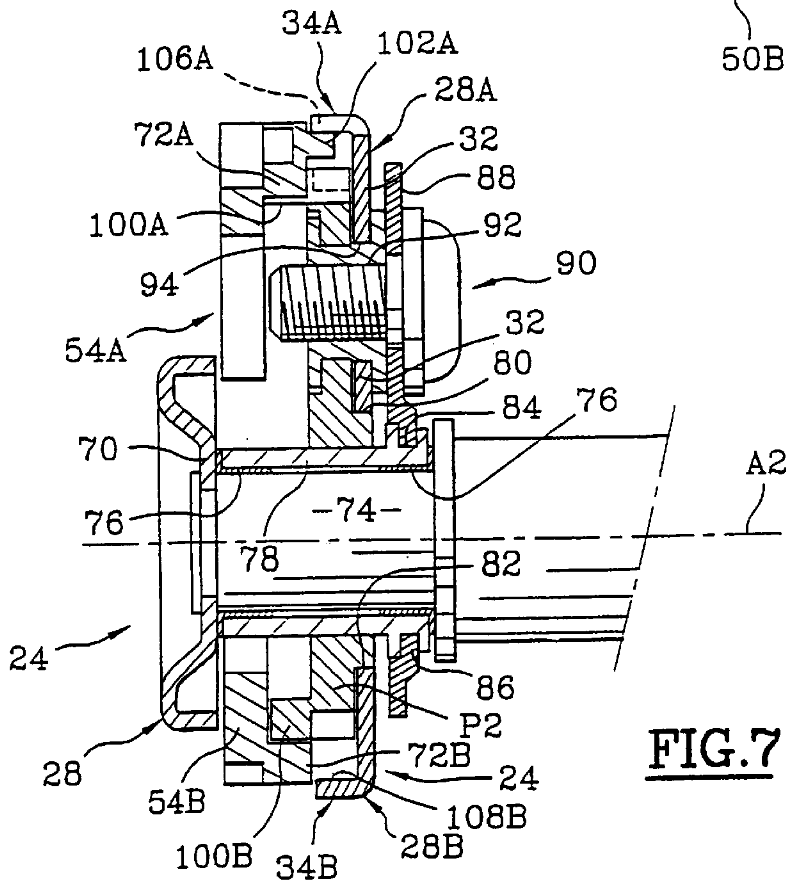

As can be seen in particular in FIG. 7, second plate 70 of the shank of rod 24 supports, close to rear end 28 of this rod, a pivot 74 of axis A2.

Pivot 74 is fixed to plate 70 and it supports rotatingly, with interposition of sliprings 76, a bush of bearing 78, on which there is mounted to rotate, around axis A2, the body of second toothed pinion P2, with which there cooperate segments 54A and 54B of rack 36.

Pinion P2 is centered by a shoulder 80 in a semicircular hole 82 of the rear portion of plate 32 of the shank of rod 24.

The bush of bearing 78 is provided with an internal radial groove 84, in which there is received a complementary rim 86 of a plate 88 belonging to door 22.

Pinion P2 is linked in rotation to plate 88 of door 22 by means of a screw 90, disposed eccentrically relative to axis A2, which passes through plate 88 and a bush 92, into which it is screwed, and which itself is supported by pinion P2.

Bush 92 is mounted slidingly in a slot 94, formed in the shape of an arc of a circle in plate 32 close to rear end 28 of rod 24, which is bounded by two rounded ends 96 and 98.

Pinion P2 is therefore linked in rotation to plate 88 of door 22, and rear end 28 of rod 24 is mounted to rotate around axis A2 relative to plate 88 of door 22 and therefore relative to pinion P2, slot 94 being centered on axis A2.

Toothed pinion P2 is provided with two toothed sectors 100A and 100B centered around axis A2, the radius of toothed sector 100A being greater than the radius of toothed sector 100B.

The teeth of first toothed sector 100A are provided to mesh with facing teeth 72A of segment 54A of rack 36, while the teeth of second toothed sector 100B are provided to mesh with teeth 72B of segment 54B, and to do so under the action of spring 60.

As can be seen in particular in FIGS. 4 and 7, each of the two segments 54A, 54B is provided with a control finger 102A, 102B, which extends laterally facing folded-over rims 34A and 34B of rear end branches 28A and 28B of the shank of rod 24.

Folded-over rims 34A and 34B of branches 28A and 28B of rear end 28 of rod 24 comprise profiles or cams for control of the angular positions of toothed segments 54A and 54B, which determine the engagement or meshing of teeth 72A, 72B of these segments with toothed sectors 100A and 100B of second pinion P2.

Thus rim 34A of branch 28A is provided at its rear free end with an external surface 104A for disengagement of segment 54A, which surface has a concave profile centered around axis A2 and which is prolonged toward the rear, beyond a recess or notch 106A, by internal face 108A for control of the engagement or meshing of segment 54A with sector 100A of pinion P2.

In the same way, rim 34B is provided at the rear end of branch 28B with an internal profile 108B for engagement of toothed segment 54B, which profile is prolonged beyond a recess or notch 106B toward the front by an external face 106B for disengagement of segment 54B.

There will now be described the functioning of the articulation device with the servo-control mechanism for reversal of the direction of pivoting of the hatchback closure around axis A2.

In the first extreme closed position illustrated in FIG. 3, rack 36 occupies its rear extreme position relative to rod 24, while pivot 68 and spring 60 are situated in particular facing rear end 68 of slot 64.

In this position, toothed sector 100B of pinion P2 meshes with teeth 72B of toothed segment 54B, while the teeth of toothed sector 100A do not mesh with teeth 72A of toothed segment 54A.

In this rear extreme position of rack 36, control finger 102A of segment 54A cooperates with external disengagement surface 104A, toward which it is urged elastically by the action of prong 60A of spring 60.

Conversely, control finger 102B of toothed segment 54B cooperates with internal engagement surface 108B; that is, referring to FIG. 3, toothed segment 54B cannot pivot in clockwise direction around the axis of its pivot 52B, thus guaranteeing that teeth 72B will mesh with the teeth of toothed sector 100B of pinion P2, the teeth additionally being urged to cooperate by the action of prong 60B of spring 60.

From this position, and referring to the figures, if the user begins to open door 22, he will on the whole cause rod 24 to rotate in counterclockwise direction around axis A1. As a result of this rotation, rack 36 is progressively driven slidingly toward the rear in direction C1, starting from the position illustrated in FIG. 3.

Referring to FIG. 3, the sliding of rack 36 toward the rear in direction C1 causes pinion P2 to rotate in clockwise direction relative to rod 24 and around axis A2.

Thus, as can be seen in FIG. 1, and in the course of the first portion of its opening path, door 22 will as a whole pivot around horizontal articulation axis A2 in clockwise direction. In other words, its lower rim 23 will not describe circular path T' centered around axis A1, as in the case of the prior art, but to the contrary will describe the first portion of path T illustrated in the figure.

As is evident in FIG. 1, this first portion of the path, in the course of which lower rim 23 progressively approaches the rear vertical plane of the vehicle, makes it possible to reduce greatly the minimum distance L between rear bumper 17 of the vehicle and the front bumper 19 of a vehicle parked close behind.

The relative pivoting and displacement movements just described with reference to FIG. 3 continue until the middle intermediate position illustrated in FIG. 4, which corresponds to the position at which the relative direction of rotation between rear end 28 of rod 24 and hatchback closure 22 is reversed.

In this intermediate position, rod 24 has substantially horizontal orientation.

Control fingers 102A and 102B of toothed segments 54A and 54B are exactly facing recesses 106A and 106B. The last tooth 100B' of toothed sector 100B of pinion P2 cooperates with the last tooth 72B' of toothed segment 54B, while the first tooth 100A' of toothed sector 100A cooperates with the first tooth 72A' of toothed segment 54A.

Control finger 102A no longer cooperates with external disengagement surface 104A and, referring to the figures, toothed segment 54A, under the action of prong 60A of spring 60, pivots in clockwise direction around the axis of pivot 52A, in such a manner as to cause meshing of first teeth 72A' and 100A'.

It is evident that the angular course of pinion P2 between the closed extreme position of FIG. 3 and the position of reversal of direction of FIG. 4 corresponds to the complete travel, by bush 92 of pivot 90, from end 98 to end 96 of slot 94.

Pivot 62, which supports spring 60, is substantially at mid-length of slot 64; that is, rack 36 on the whole is at mid-length of its maximum course relative to the shank of rod 24.

From the position illustrated in FIG. 4, if rack 36 continues its course in direction C1 toward the front of the vehicle, or in other words if the phase of opening of the door continues, the teeth of toothed segment 54A, referring to FIG. 4, will stop the clockwise rotation of pinion P2 around axis A2 and will force this pinion to turn in the opposite, or counterclockwise direction.

By means of tooth 100B', acting on the flank of the last tooth 72B' of toothed segment 54B, the toothing of toothed sector 100B then makes this segment 54B pivot around the axis of pivot 52B, thus causing unmeshing or disengagement thereof, since finger 102B is no longer braced against internal engagement surface 108B.

From the position illustrated in FIG. 4, if opening continues, the movements of sliding and rotation continue until the maximum open position illustrated in FIG. 5 is reached.

During the course of opening of door 22 between FIGS. 4 and 5, control finger 102B of toothed segment 52B of rack 36 cooperates with external disengagement surface 104B and, despite the action of prong 60B of spring 60, toothed segment 54B cannot pivot in counterclockwise direction around the axis of its pivot 52B, and therefore accidental engagement between teeth 72B and the teeth of sector 100B of pinion P2 cannot occur.

In contrast, control finger 102A cooperates with internal engagement surface 108A in such a manner as to guarantee that teeth 72A always engage with the teeth of toothed sector 100A.

The cooperation of the teeth of toothed segment 52A with the teeth of pinion P2 during relative sliding of rack 36 toward the front in direction C1 relative to rod 24—between the positions illustrated in FIGS. 4 and 5—then simultaneously causes, referring to FIGS. 4 and 5, rotation of pinion P2 and therefore of door 22 in the counterclockwise direction relative to rear end 28 of rod 30.

Referring to FIG. 1, it is therefore evident that, starting from the middle position in which rod 24 is horizontal and up to the open upper position in which rod 24 is substantially vertical, door 22 pivots around axis A2 in counterclockwise direction, in such a manner as to arrive at an extreme open position of door 22, in which it extends substantially horizontally above the roof of the vehicle, with its outside surface facing up.

During this second portion of the opening movement, lower rim 23 is of course displaced once again toward the rear relative to the rear vertical plane of the vehicle, but this takes place in a zone situated at such a height that there is no risk of interference and collision with the front portion of the body of the vehicle situated immediately therebehind.

All the sliding and rotational movements just described are reversed during closing of the door.

To facilitate manipulations, the door can of course be equipped with means (not illustrated in the figures) of known design which compensate for the mass thereof and facilitate manipulations thereof.

What is claimed is:

1. An articulation device for a hatchback closure member mounted pivotally on the body of a motor vehicle for obtaining a first closed position and a second open position of the closure member, comprising:

a mechanism with first and second parallel articulation axes and a connecting rod linking the articulation axes, a first end of a said rod being pivoted on the vehicle body structure around said first articulation axis, a second end of said rod being pivoted on the hatchback closure member around said second articulation axis, parallel to said first articulation axis, and a control mechanism for automatically controlling pivoting movement of the hatchback closure member relative to said second end of the rod by a pivoting movement of said first end of said rod relative to the vehicle body structure, wherein a direction of pivoting of said hatchback closure relative to said second end of said rod is reversed during the pivoting movement of said first end of said rod relative to the vehicle body structure, between two angular positions assumed in a closed and an open position, respectively, of the hatchback closure.

2. An articulation device according to claim 1, which comprises a first pinion is rotatably connectable to the vehicle body and a second pinion is rotatably connectable to the closure member and having first and second diametrically opposed toothed sections, wherein said control means comprises a servo-control mechanism, a rack which is mounted for sliding longitudinally relative to a shank of said rod, said rack having a first toothed end which cooperates continuously with said first pinion rack having a second, forked end having two substantially parallel toothed branches which extend toward a rear portion thereof and which respectively alternately cooperate with toothed sectors of said second pinion.

3. An articulation device according to claim 2, wherein each of said two branches of the fork are mounted so as to be moveable relative to said shank of said rack, around a front axis of rotation parallel to the articulation axes of said rod, said articulation axes being rotatable around said first axis in the direction upon the engagement of said branch with a corresponding toothed section of the second pinion, and wherein each branch is engageable or disengageable from said teeth of said second pinion as a function of a longitudinal position of said second end of said rack relative to said shank of said rod.

4. An articulation device according to claim 3, wherein the control mechanism comprises a control finger supported by said branch and extending laterally for cooperation with a control member with a substantially longitudinal orientation, positioned in facing relationship on said shank of said rod, in proximity to said second end of said rod.

5. An articulation device according to claim 4, wherein said control mechanism includes a control finger and two consecutive segments, a first segment of which is externally provided for disengagement and a second internal segment of which is provided for engagement, separated by a reversing recess which permits passage of said control finger from one to the other of said two segments, said segments being offset transversely relative to one another and relative to the longitudinal axis of sliding of said rack.

6. An articulation device according to claim 1, which comprises a balance device for balancing the hatchback closure.

7. An articulation device in combination with a motor vehicle having a hatchback closure member pivotally mounted on the body of the motor vehicle for obtaining a first closed position and a second open position of the closure member, comprising:

a mechanism with first and second parallel articulation axes and a connecting rod linking the articulation axes, a first end of a said rod being pivoted on the vehicle body structure around said first articulation axis, a second end of said rod being pivoted on the hatchback closure member around said second articulation axis, parallel to said first articulation axis, and a control mechanism for automatically controlling pivoting movement of the hatchback closure member relative to said second end of the rod by a pivoting movement of said first end of said rod relative to the vehicle body structure, wherein a direction of pivoting of said hatchback closure relative to said second end of said rod is reversed during the pivoting movement of said first end of said rod relative to the vehicle body structure, between two angular positions assumed in a closed and an open position, respectively, of the hatchback closure:

wherein said hatchback closure member comprises a door which, in the closed position, extends in a substantially vertical plane and which, in the open position, extends in a substantially horizontal plane above the vehicle.

8. An articulation device in combination with a motor vehicle according to claim 7, wherein said door comprises a panel which covers an opening in a structural frame of the body of the vehicle; the frame defining an upper crossbeam, two vertical side posts and one lower crossbeam, wherein said vertical side posts support said articulation axis of said first end of said connecting rod, said second end of said connecting rod being pivoted on said second articulation axis supported by the door.

9. An articulation device for a hatchback closure member mounted pivotally on the body of a motor vehicle for obtaining a first closed position and a second open position of the closure member, comprising:

a mechanism with first and second parallel articulation axes and a connecting rod linking the articulation axes, a first end of a said rod being pivoted on the vehicle body structure around said first articulation axis, a second end of said rod being pivoted on the hatchback closure member around said second articulation axis, parallel to said first articulation axis, and control means for automatically controlling pivoting movement of the hatchback closure member relative to said second end of the rod by a pivoting movement of said first end of said rod relative to the vehicle body structure, wherein a direction of pivoting of said hatchback closure relative to said second end of said rod is reversed during the pivoting movement of said first end of said rod relative to the vehicle body structure, between two angular positions assumed in a closed and an open position, respectively, of the hatchback closure.

10. An articulation device according to claim 9, which comprises a first pinion rotatably connectable to the vehicle body and a second pinion rotatably connectable to the closure member and having first and second diametrically opposed toothed sections, wherein said control means comprises a servo-control means, a rack which is mounted for sliding longitudinally relative to a shank of said rod, said rack having a first toothed end which cooperates continuously with said first pinion rack having a second, forked end of having two substantially parallel toothed branches which extend toward a rear portion thereof and which respectively alternately cooperate with toothed sectors of said second pinion.

11. An articulation device according to claim 10, wherein each of said two branches of the fork are mounted so as to be moveable relative to said shank of said rack, around a front axis of rotation parallel to the articulation axes of said rod, said articulation axes being rotatable around said first axis in the direction upon the engagement of said branch with a corresponding toothed section of the second pinion, and wherein each branch is engageable or disengageable from said teeth of said second pinion as a function of a longitudinal position of said second end of said rack relative to said shank of said rod.

12. An articulation device according to claim 11, wherein the control means comprises a control finger supported by said branch and extending laterally for cooperation with a control member with a substantially longitudinal orientation, positioned in facing relationship on said shank of said rod, in proximity to said second end of said rod.

13. An articulation device according to claim 12, wherein said control means includes a control finger and two consecutive segments, a first segment of which is externally provided for disengagement and a second internal segment of which is provided for engagement, separated by a reversing recess which permits passage of said control finger from one to the other of said two segments, said segments being offset transversely relative to one another and relative to the longitudinal axis of sliding of said rack.

14. An articulation device according to claim 9, which comprises a balance device for balancing the hatchback closure.

15. An articulation device in combination with a motor vehicle having a hatchback closure member pivotally mounted on the body of the motor vehicle for obtaining a first closed position and a second open position of the closure member, comprising:

a mechanism with first and second parallel articulation axes and a connecting rod linking the articulation axes, a first end of a said rod being pivoted on the vehicle body structure around said first articulation axis, a second end of said rod being pivoted on the hatchback closure member around said second articulation axis, parallel to said first articulation axis, and control means for automatically controlling pivoting movement of the hatchback closure member relative to said second end of the rod by a pivoting movement of said first end of said rod relative to the vehicle body structure, wherein a direction of pivoting of said hatchback closure relative to said second end of said rod is reversed during the pivoting movement of said first end of said rod relative to the vehicle body structure, between two angular positions assumed in a closed and an open position, respectively, of the hatchback closure;

wherein said hatchback closure comprises a door which, in the closed position, extends in a substantially vertical plane and which, in the open position, extends in a substantially horizontal plane above the vehicle.

16. An articulation device in combination with a motor vehicle according to claim 15, wherein said door comprises a panel which covers an opening in a structural frame of the body of the vehicle; the frame defining an upper crossbeam, two vertical side posts and one lower crossbeam, wherein said vertical side posts support said articulation axis of said first end of said connecting rod, said second end of said connecting rod being pivoted on said second articulation axis supported by the door.

* * * * *

UNITED STATES PATENT AND TRADEMARK OFFICE

CERTIFICATE OF CORRECTION

PATENT NO. : 6,234,563 B1
DATED : May 22, 2001
INVENTOR(S) : Jacques Bascou

Figure 9:
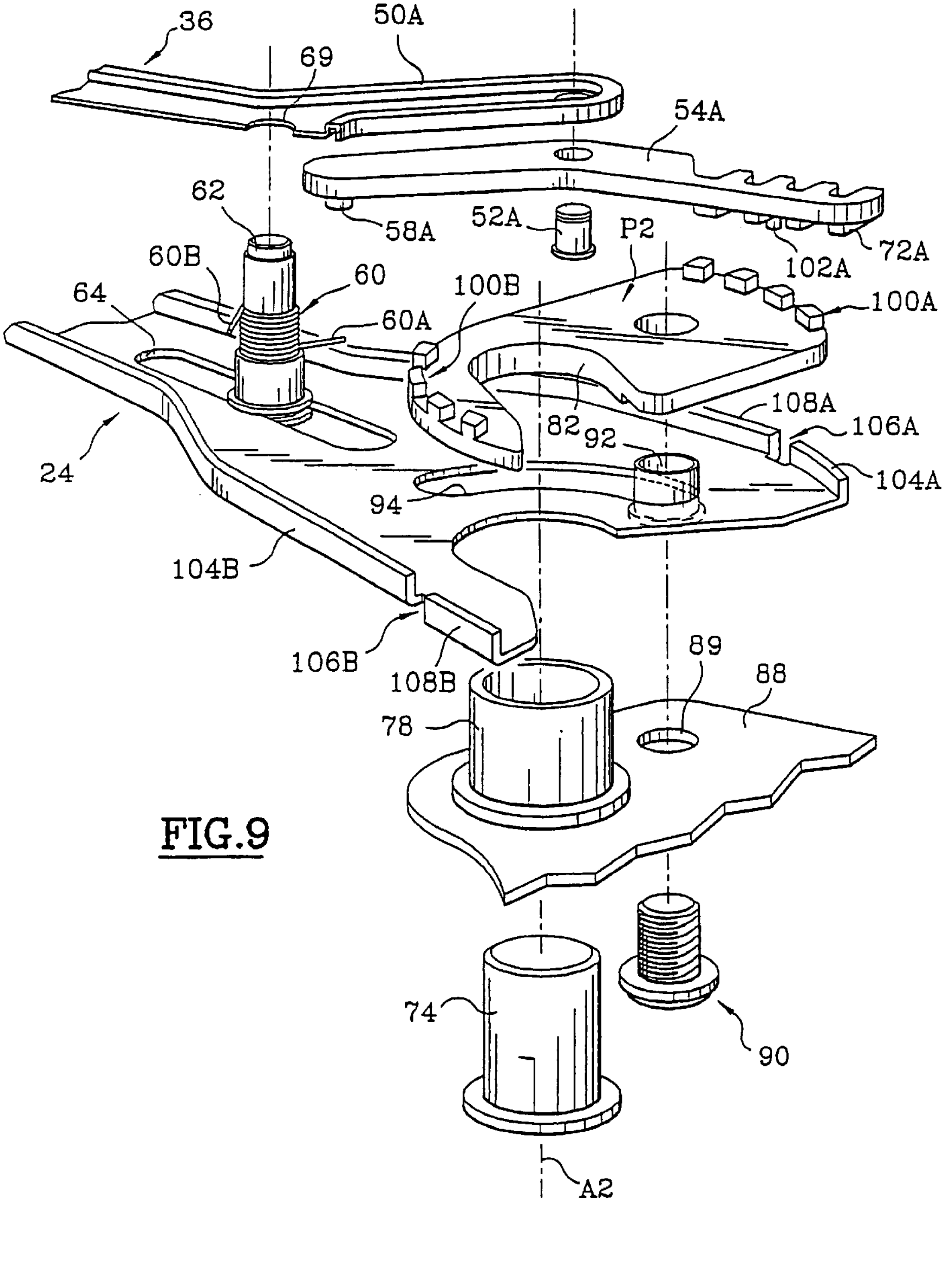
FIG. 9 is a partial perspective exploded view which illustrates the main active components of the articulation device according to the teachings of the invention, installed at the rear end of the rod.
Figure 2:
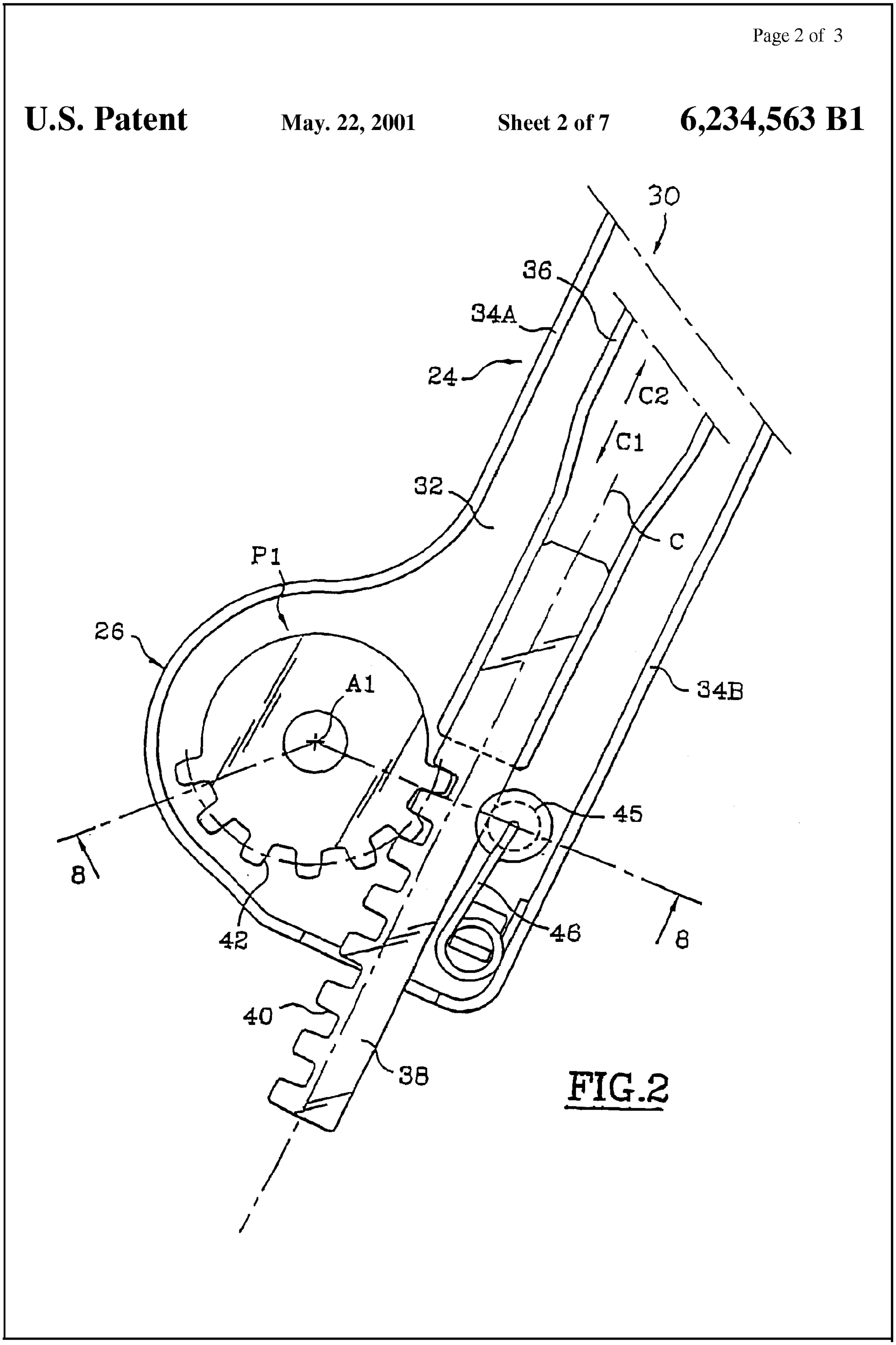
Figure 9:
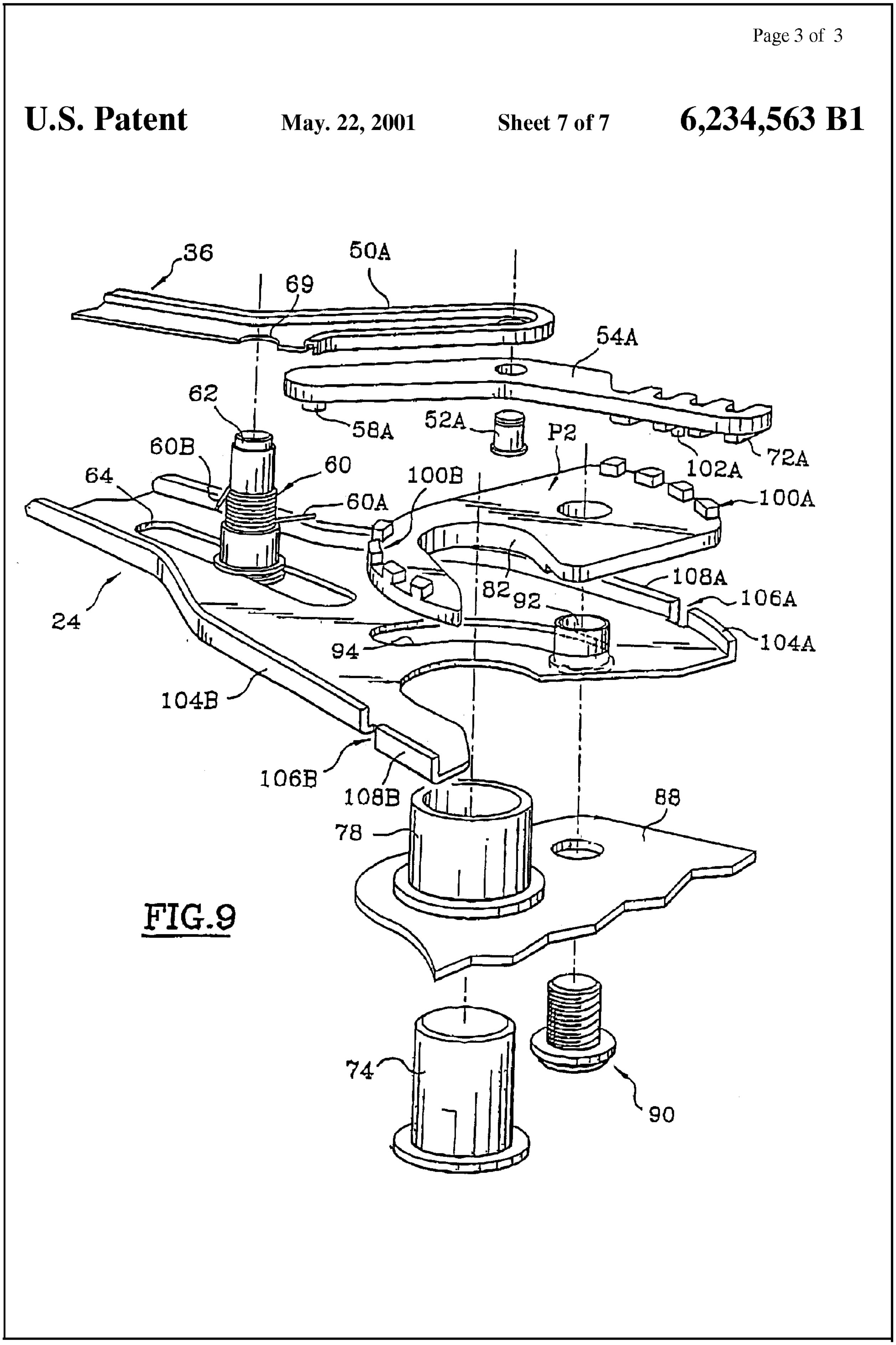

It is certified that error appears in the above-identified patent and that said Letters Patent is hereby corrected as shown below:

Delete Figs. 2 and 9 and substitute therefore the Figs. Consisting of 2 and 9 as shown on the attached page.

Signed and Sealed this

Eighth Day of October, 2002

*Attest:*

JAMES E. ROGAN

*Attesting Officer* *Director of the United States Patent and Trademark Office*